(No Model.) 2 Sheets—Sheet 1.
W. McCRORY & E. O. McGLAUFLIN.
BRAKE FOR CABLE CARS.
No. 419,616. Patented Jan. 14, 1890.
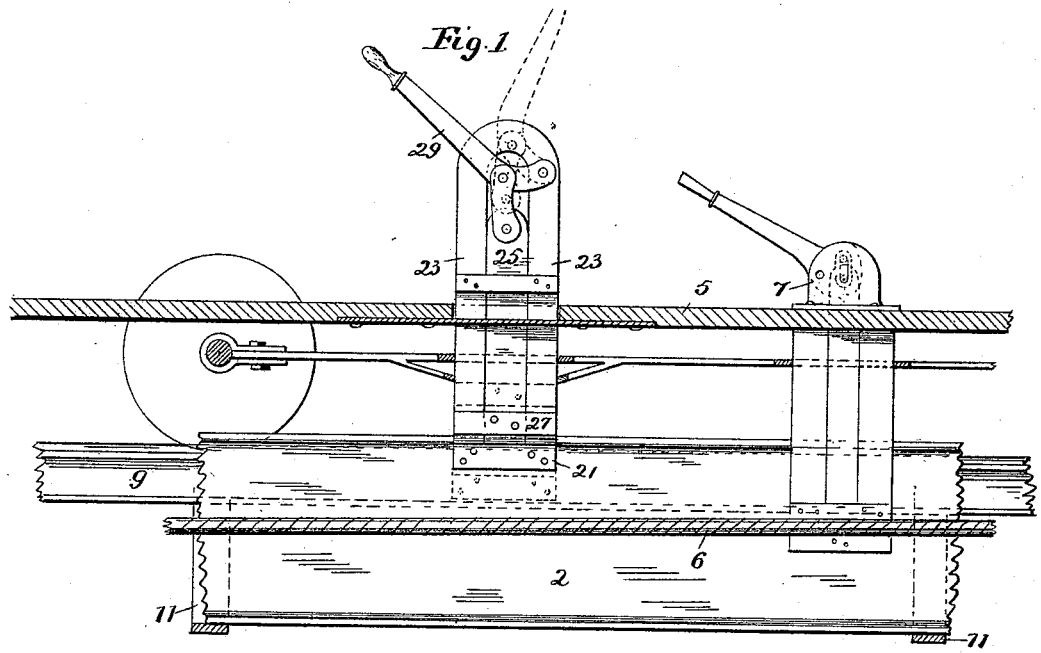
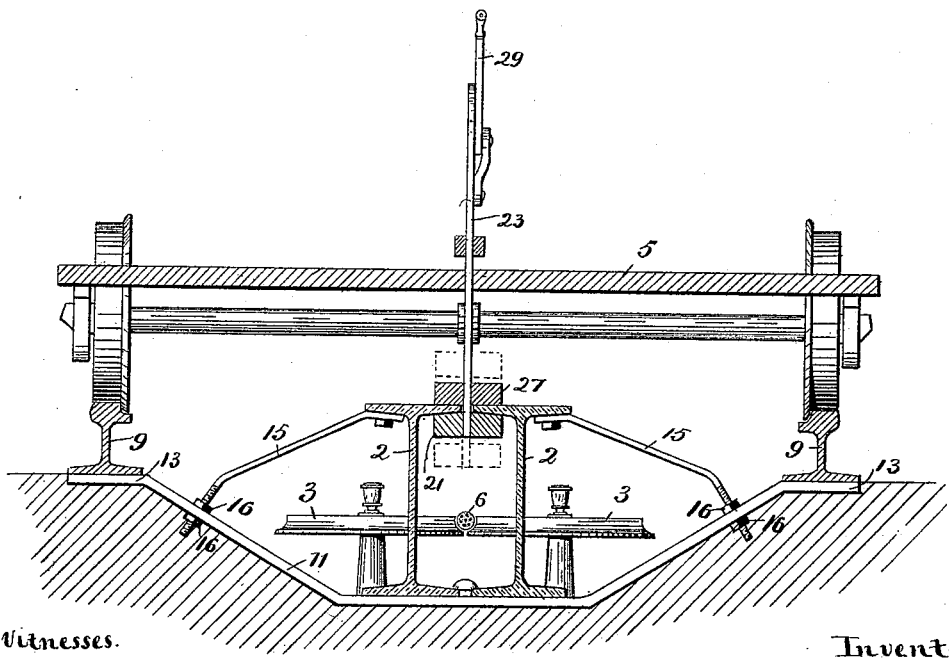
Witnesses.
J. Jensen
A. M. Gaskill
Inventors.
William McCrory
and
Eugene O. McGlauflin
By Paul & Merwin attys (No Model.) 2 Sheets—Sheet 2.
W. McCRORY & E. O. McGLAUFLIN.
BRAKE FOR CABLE CARS.
No. 419,616. Patented Jan. 14, 1890.
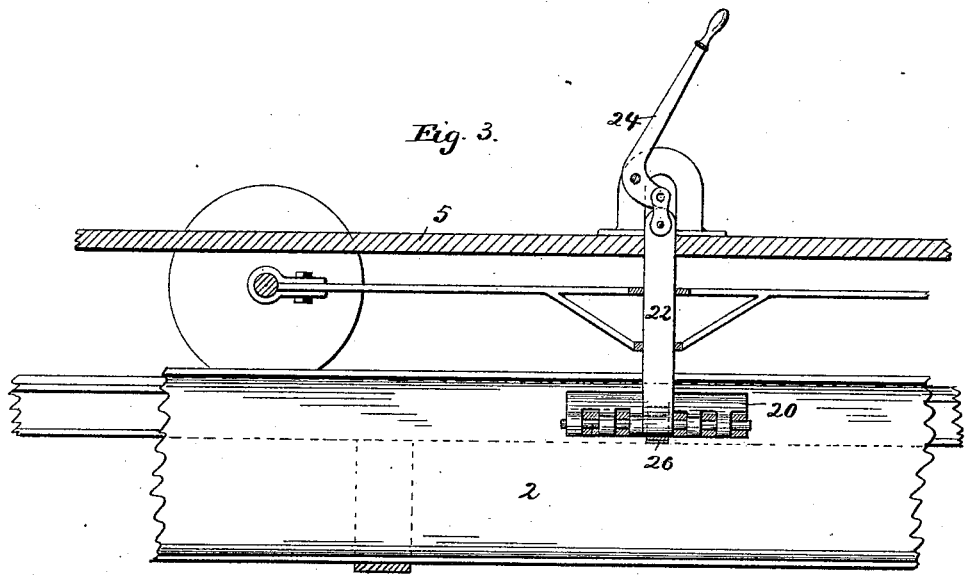
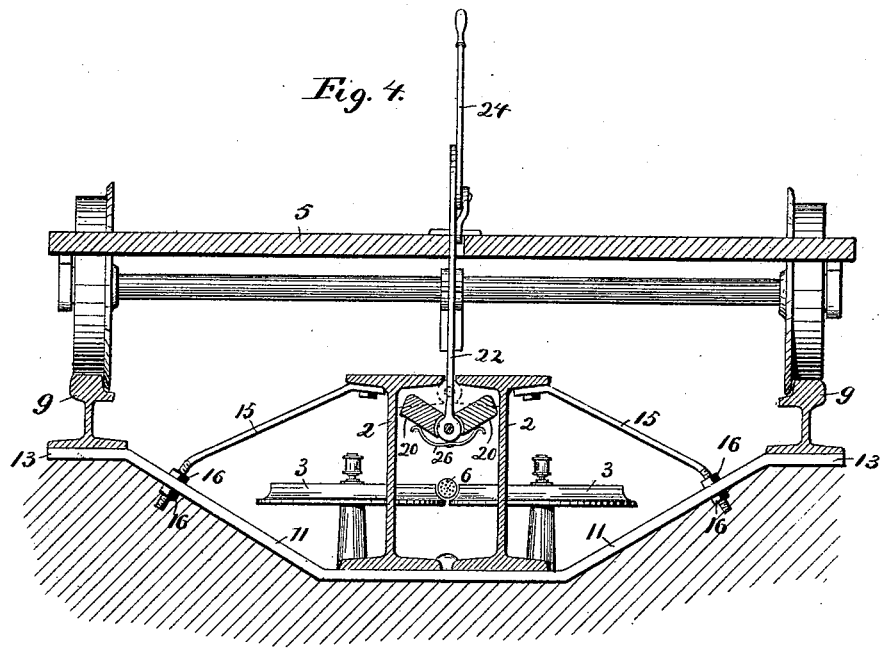
Witnesses
J. Jessen
A. M. Gaskell
Inventors.
William McCrory
and
Eugene O. McGlauflin
By Paul & Merwin attys

UNITED STATES PATENT OFFICE.

WILLIAM McCRORY, OF MINNEAPOLIS, AND EUGENE O. McGLAUFLIN, OF ANOKA, MINNESOTA.

BRAKE FOR CABLE CARS.

SPECIFICATION forming part of Letters Patent No. 419,616, dated January 14, 1890.

Application filed January 8, 1889. Serial No. 295,772. (No model.)

*To all whom it may concern:*

Be it known that we, WILLIAM McCRORY, of Minneapolis, in the county of Hennepin and State of Minnesota, and EUGENE O. McGLAUFLIN, of Anoka, in the county of Anoka and State of Minnesota, have invented certain new and useful Improvements in Brakes for Cable Roads, of which the following is a specification.

This invention relates to improvements in brakes designed particularly for use with the cable roads for which Letters Patent were granted to us August 17, 1886, No. 347,624, and March 22, 1887, No. 359,802.

The object of our present invention is to provide a brake mechanism which may be brought into engagement with the beams forming the conduit for the purpose of stopping the car or holding it at any point.

In the accompanying drawings, forming a part of this specification, Figure 1 is a longitudinal section of a portion of a road and car embodying our invention. Fig. 2 is a transverse vertical section of the same. Fig. 3 is a view similar to Fig. 1, showing a modification of the brake. Fig. 4 is a transverse vertical section of the construction shown in Fig. 3.

In the drawings, 2 2 represent the I-beams which form the conduit, and 3 3 the cable-supporting wheels, substantially as in our former patents hereinbefore referred to.

We prefer to provide an improved safety-brake, by means of which a car may be stopped or held at any desired point. For this purpose we provide a brake having a shoe that is arranged within the conduit and is adapted to engage the inner surface, as hereinafter described.

The brake may be, if preferred, provided with an additional shoe which engages the exterior portion of the top of the conduit. As shown in Figs. 1 and 2, a suitable shoe 21 is arranged within the conduit and is supported upon a bar 23, that passes through the slot in the top of the conduit. A bar 25 is arranged between the two parts of the bar 23 and carries a shoe or block 27, that is adapted to engage the exterior of the top of the conduit at each side of the slot. A lever 29 is provided, by means of which the bars 23 and 25 may be raised or lowered, and thereby the blocks 21 and 27 be brought toward each other or be separated. When the blocks are drawn together, the block 21 impinges against the under surface of the top of the conduit and the block 27 against the upper surface thereof. The flanges of the I-beams at either side of the slot are firmly clasped between the blocks, which act as a safety-brake and will stop or hold the train upon any grade.

The block 27 may, if preferred, be omitted and the block 21 be used alone. This block engages the interior wall of the conduit, which is always free from ice and snow, and it may be brought with any desired force against this surface, so that it will be impossible for the brake to slip.

In Figs. 3 and 4 we have shown a brake of a different construction, but also arranged to engage the inner surface of the conduit. This brake consists of two blocks 20, which may be formed wholly or partially of rubber, and which are hinged together at the center and secured upon a vertical sliding bar 22, that passes through the slot in the conduit, and is adapted to be operated by a lever 24 upon the car. A spring 26 is arranged to bear upon both blocks, as shown in Fig. 4, so as to partially close them as they are moved away from the surface of the conduit. As the bar 22 is raised the blocks are brought against the under surface of the top of the conduit, and, turning upon their hinge, are brought into a substantially-horizontal position, as indicated by dotted lines in Fig. 4. The blocks then impinge upon the under surface of the top of the conduit and upon the upper portions of the side walls of the same. This forms a brake of great efficiency, which may be easily operated, and which is of great durability.

We claim as our invention—

1. The combination, with the car and the conduit-rail, of the sliding bars moving in opposite directions and provided with shoes lying on opposite sides of the slotted conduit-rail, and a lever pivoted to one of said bars, and having a pivoted link-connection, substantially as set forth, to the other bar, for the purposes set forth.

2. The combination, with a cable conduit and car, of a vertically-sliding brake-bar arranged on said car and extending into said conduit, and spring-controlled brake-blocks hinged upon said bar within said conduit, and adapted, as said bar is raised, to be brought against the inner surface of the top part of the conduit, substantially as described.

In testimony whereof we have hereunto set our hands this 20th day of December, 1888.

WILLIAM McCRORY.
EUGENE O. McGLAUFLIN.

In presence of—
A. C. PAUL,
A. M. GASKILL.